United States Patent [19]  
Becker et al.

[11] 4,281,999  
[45] Aug. 4, 1981

[54] AQUEOUS DYE PREPARATIONS OF DYES DIFFICULTLY SOLUBLE IN WATER

[75] Inventors: Carl Becker, Basel, Switzerland; Georges Mahler, Sierentz, France; Paul Erzinger, Liestal, Switzerland

[73] Assignee: Ciba-Geigy Corporation, Ardsley, N.Y.

[21] Appl. No.: 973,777

[22] Filed: Dec. 27, 1978

[30] Foreign Application Priority Data

Dec. 29, 1977 [CH] Switzerland ............... 16184/77

[51] Int. Cl.³ .................. C09B 1/00; C09B 5/62; C09B 67/00
[52] U.S. Cl. ............................................. 8/527; 8/528
[58] Field of Search .................. 8/89 R, 89 A, 39 R, 8/527, 528

[56] References Cited

U.S. PATENT DOCUMENTS

| 3,767,587 | 10/1973 | Clemsmon et al. | 252/301.2 W |
|---|---|---|---|
| 3,957,425 | 5/1976 | Tullio | 8/89 R |
| 3,963,432 | 6/1976 | Haurwell et al. | 8/89 R |
| 4,061,464 | 12/1977 | Hahnke et al. | 8/39 R |
| 4,063,880 | 12/1977 | Tullio | 8/89 R |
| 4,073,615 | 2/1978 | Lacroix et al. | 8/39 R |
| 4,110,073 | 8/1978 | Mollet et al. | 8/89 R |
| 4,168,144 | 10/1979 | Curry et al. | 8/89 R |

FOREIGN PATENT DOCUMENTS 2314326 3/1973 Fed. Rep. of Germany ........... 8/89 A  
2323435 8/1977 France .

Primary Examiner—William F. Hamrock  
Attorney, Agent, or Firm—Edward McC. Roberts

[57] ABSTRACT

The invention relates to novel aqueous dye preparations of dyes difficultly soluble in water, to processes for producing these dye preparations, to the use thereof for preparing printing pastes, and to the use of the said dye preparations for printing carrier materials for transfer printing, for printing in particular textile materials, or for dyeing textile materials, and also to the printed carrier materials, and to the material printed by means of these dye preparations in the transfer-printing process, or to the material dyed or printed in the dyeing or printing process. The novel dye preparations contain water, a finely dispersed dye of which the solubility in boiling perchloroethylene is lower than 0.5 g/kg, an anionic and/or nonionic dispersing agent, a resin which has affinity for the dye and which is more soluble than the dye in a solvent having limited miscibility with water, and optionally further additives.

15 Claims, No Drawings

AQUEOUS DYE PREPARATIONS OF DYES DIFFICULTLY SOLUBLE IN WATER

The invention relates to novel aqueous dye preparations of dyes difficultly soluble in water, to a process for producing these dye preparations, to the use thereof for preparing printing pastes, and to the use of the said dye preparations for printing carrier materials for transfer printing, for printing in particular textile materials, or for dyeing textile materials, and also to the printed carrier materials, and to the material printed by means of these dye preparations in the transfer-printing process, or to the material dyed or printed in the dyeing or printing process.

Commercial preparations of dyes difficultly soluble in water are known, both in liquid and powder forms. The latter have the disadvantage that they firstly have to be dispersed in water before they can be used. The known liquid formulations have the disadvantage that as a rule they contain large amounts of dispersing agents, usually in excess of 30 percent by weight, and only about 20 percent by weight of dye.

From German Offenlegungsschrift No. 2,520,527 is known that storage-stable liquid dye preparations having a high concentration of dye insoluble to difficultly soluble in water can be produced by using selected anionic dispersing agents together with nonionic dispersing agents and hydrotropic agents, particularly urea.

The use of hydrotropic agents has however in many cases disadvantages. Preparations which contain ionic hydrotropic agents are, on account of their electrolyte content being too high, not to be used in electrolyte-sensitive application media, for example in media containing polyacrylate thickeners. Preparations containing urea as the hydrotropic agent undergo on prolonged storage, on account of ammonia being split off, a change of pH value, which can lead in the case of alkali-sensitive dyes to partial decomposition. Furthermore, as a result of ammonia being split off, electrolyte is additionally formed. With the presence of urea, there is moreover in the case of many thickeners the danger that these become brown or that they harden, with the result that they are difficult to wash out. In addition, the formation of ammonia in the hermetically sealed vessels in which the preparations are stored can lead to a dangerous excess pressure being generated.

The known aqueous dye preparations containing disperse or vat dyes which are difficultly soluble in water but which are to a slight degree hydrophilic, that is to say, those of which the solubility in boiling perchloroethylene is lower than 0.5 g/kg, have the great disadvantage that during their production or storage there is a tendency for thixotropic gel formation and/or recrystallisation to occur, and consequently they are of no use in practice.

Novel aqueous preparations which do not have these disadvantages have now been found. They are characterised in that they contain, besides the stated dyes, water, anionic and/or nonionic dispersing agent, a resin which has affinity for the dye, and which is more soluble than the dye in a solvent having limited miscibility with water, optionally together with further additives.

In preparations of this composition, the addition of a hydrotropic agent is surprisingly no longer necessary, and the stated disadvantages caused by these agents are eliminated.

Dyes usable according to the invention are above all disperse and vat dyes. They are dyes of various classes: the disperse dyes are for example nitro dyes, aminoketone dyes, ketonimine dyes, methine dyes, nitrodiphenylamine dyes, quinoline dyes, aminonaphthoquinone dyes, coumarin dyes, and in particular anthraquinone dyes and azo dyes, such as monoazo and disazo dyes.

Vat dye which can be used are for example indigoid dyes, anthraquinoid dyes, such as indanthrene, as well as sulfur dyes and leuco vat dyes.

It is to be understood that the term dyes embraces also optical brighteners. These are e.g. difficultly water-soluble brighteners of the following classes of compounds: stilbenes, coumarins, benzocoumarins, pyrenes, pyrazines, pyrazolines, oxazines, mono- or dibenzoxazolyl or -imidazolyl compounds or aryltriazole and v-triazole derivatives, as well as naphthalic acid imides.

The dyes of the following formulae are for example applicable:

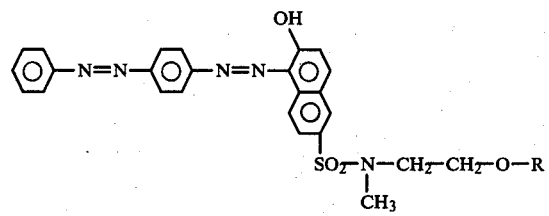

in which R is H or OCCH$_3$;

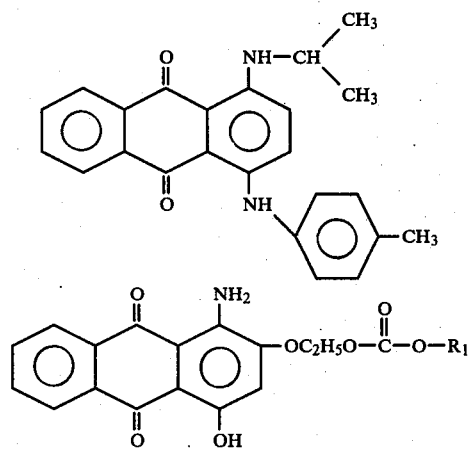

in which R$_1$ is C$_2$H$_5$ or C$_6$H$_5$;

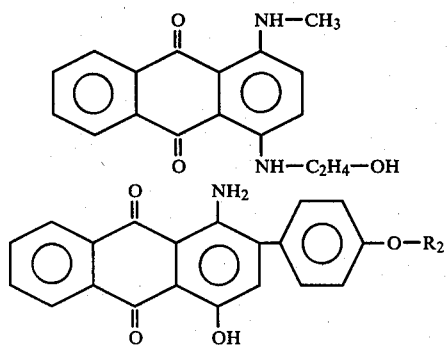

in which R$_2$ is H or CH$_3$.

It is obvious that the type of dye is governed largely by the shade of colour desired and by the field of application of the aqueous dye preparations according to the invention. If for example these preparations are used to prepare printing pastes and for further application in transfer printing, the difficultly water-soluble dyes used will be those which are suitable for the transfer printing process, especially disperse dyes which are converted at atmospheric pressure between 150° and 220° C. to the extent of at least 60% in less than 60 seconds into the vapour state, which are stable to heat and which are transferable without undergoing decomposition. If however the preparations are used for example for producing printing pastes for printing textile materials in the direct printing process, a preferred type of application of the dye preparations according to the invention, or for producing dye baths for dyeing textile materials, the dyes used will be disperse dyes which have good dyeing and fixing properties, and which give dyeings that are fast to wet processing, to sublimation and to light.

It is moreover possible to use in the aqueous preparations mixtures of identical or different types of dyes and of optical brighteners within the limits as defined. The preparations according to the invention preferably contain 25-60 percent by weight, particularly 35-50 percent by weight, of dye or of optical brightener.

Suitable anion-active dispersing agents are above all lignin sulfonates, for example those obtained by the sulfite or Kraft process. They are preferably products which have been partially hydrolysed, oxidised or desulfonated, and have been fractionated by known processes, for example according to the molecular weight or the degree of sulfonation. Also effective are mixtures of sulfite and kraft lignin sulfonates.

Likewise readily applicable in the preparations according to the invention are sulfonated condensation products such as are described in the German Offenlegungsschrift No. 2,353,691. They are in particular compounds which have been obtained by reaction of a naphthalene compound, which is unsubstituted or substituted by hydroxyl, chlorine or methyl, with a compound of the formula

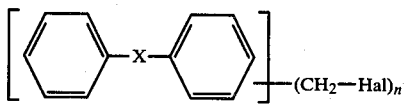

in which X is the direct bond or oxygen, "Hal" is chlorine or bromine, and n is a number from 1 to 4 inclusive, and sulfonation, and optionally by further condensation with formaldehyde or with compounds yielding formaldehyde.

Furthermore, condensation products of aromatic sulfonic acids with formaldehyde, such as condensation products from formaldehyde and naphthalene sulfonic acids, or from formaldehyde, naphthalene sulfonic acid and benzene sulfonic acid, or a condensation product from crude cresol, formaldehyde and naphthalene sulfonic acid, have proved suitable as anionic dispersing agents for the preparations according to the invention.

Further suitable anionic dispersing agents are the compounds of the formula $$R-X-(CH_2-CR^1-Y)_a-(CH_2-CR^2-Z)_b-H$$

which are described in the U.S. Pat. Nos. 3,498,942, 3,632,466, 3,498,943, 3,772,382, 3,668,230, 3,776,874 and 3,839,405, especially the potassium salts of these compounds, with a molecular weight of about 1200 to 1500 (Polywet KX-3, KX-4 and KX-5).

These anionic dispersing agents are usually present in the form of their alkali salts, their ammonium salts or their water-soluble amine salts. It is advantageous to use qualities having a low content of other electrolytes. It is also possible to use mixtures of the anionic dispersing agents mentioned above.

The amount of anionic dispersing agent is 0.1 to 5, particularly 0.5 to 2, percent by weight, relative to the weight of the preparation.

In place of, or preferably additionally to, the anionic dispersing agent, the preparations according to the invention can contain 0.1 to 5 percent by weight, particularly 0.5 to 2 percent by weight, relative to the weight of the preparations, of a nonionic dispersing agent. Suitable nonionic dispersing agents are above all copolymers from ethylene oxide and propylene oxide having an ethylene oxide content of at least 65 percent by weight, preferably at least 80 percent by weight.

Preferred copolymers are those of ethylene oxide and propylene oxide of the formula

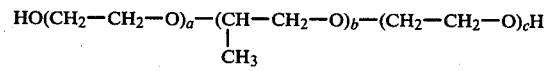

in which the sum of a and c is a number of at least 150, preferably between 200 and 400, and b is a number between 20 and 100, preferably between 30 and 80.

Suitable resins for the preparations according to the invention are resins which have affinity for the dye used, and which are more soluble than the dye in a solvent having limited miscibility with water. They are preferably synthetic resins, especially ketone resins, that is to say, compounds which are produced either by self-condensation of aliphatic, aliphatic-aromatic or cycloaliphatic ketones, or by condensation of these ketones with aldehydes, particularly with formaldehyde.

Especially suitable among these are the condensation products from acetophenone and formaldehyde, in particular however from cyclohexanone and formaldehyde.

These resins are contained in the preparations according to the invention in an amount of 1 to 10 percent by weight, preferably 3 to 7 percent by weight, relative to the weight of dye.

If required, the dye preparations may contain further additives improving properties, for example hydroscopic agents, and antifrost agents, for example polyols, ethylene glycol, monopropylene glycol, diethylene glycol, glycerol, sorbitol and others, or formamide; antimicrobics; fungicides, for example formalin solution; antifoaming agents, agents improving viscosity, or complexing compounds.

Preparations which have proved particularly stable in storage are those containing at least 10 percent by weight of water, 25 to 60 percent by weight of a finely dispersed, difficultly water-soluble dye as defined, 0.1 to 5 percent by weight of an anionic dispersing agent and-/or 0.1 to 5 percent by weight of a nonionic dispersing agent, a resin, and also optionally further additives, the resin being present in an amount of 1 to 10 percent by weight, relative to the dye.

Particularly suitable among these are those containing at least 20 percent by weight of water, 25 to 60 percent by weight of a difficultly water-soluble, finely dispersed dye as defined, 0.1 to 5 percent by weight of a lignin sulfonate, 0.1 to 5 percent by weight of a copolymer from ethylene oxide and propylene oxide containing at least 65 percent by weight of ethylene oxide, and a resin, as well as optionally further additives, the resin being present in an amount of 1 to 10 percent by weight, relative to the dye.

Especially valuable preparations are those containing at least 20 percent by weight of water, 35 to 50 percent by weight of a difficultly water-soluble, finely dispersed dye as defined, 0.5 to 2 percent by weight of a lignin sulfonate, 1 to 3 percent by weight of a copolymer from ethylene oxide and propylene oxide containing at least 80 percent by weight of ethylene oxide, and a resin, as well as optionally further additives, the resin being present in an amount of 3 to 7 percent by weight, relative to the dye.

The novel aqueous dye preparations are advantageously produced by firstly forming granules containing a difficultly water-soluble, finely dispersed dye as defined and a resin, and grinding these granules in water with the addition of at least one anionic and/or nonionic dispersing agent, and optionally adding the remaining constituents before, during or after the grinding process, so that a preparation is formed of which the particle size is smaller than $10\mu$, particularly smaller than $2\mu$.

The granules can be produced in various ways. Preferably used is one of the following four variants:

(1) The difficultly water-soluble dye is dissolved, preferably with heating, together with the resin in a solvent having limited miscibility with water; and water, heated if necessary, is subsequently added, as a result of which granules are precipitated, possibly not until after cooling.

(2) The difficultly water-soluble dye is stirred together with anionic and/or nonionic auxiliaries in water; a ground dispersion of the resin in water, which optionally contains further additives, is added; and grinding is performed until the particle size of the dye is smaller than $10\mu$. A solvent having limited miscibility with water is then added in such an amount that a system having two liquid phases is formed; stirring is maintained until the dye passes over into the organic phase, and granules are subsequently separated out by the addition of water.

(3) The difficultly water-soluble dye is added, together with anionic and/or nonionic auxiliaries, to water; grinding is then performed until the particle size of the dye is smaller than $10\mu$; a solution of a resin in a solvent having limited miscibility with water, which optionally contains further additives, is subsequently added in such an amount that a system having two liquid phases is formed; stirring is maintained until the dye passes over into the organic phase, and granules are finally precipitated by the addition of water.

(4) The resin is stirred into a solvent miscible with water, and the dye and water are afterwards added. The solvent is subsequently distilled off, optionally with the addition of further water. After complete removal of the solvent, the mixture is allowed to cool, and the dye is filtered off.

Suitable solvents having limited miscibility with water are preferably solvents which have a solubility in water of about 10 to 350 g/l and a boiling point of above 90° C., preferably above 150° C., and also a flash point above 20° C., preferably above 40° C., for example esters such as ethyl glycol acetate or ethylene glycol monoethyl ether acetate; alcohols such as butanol, benzyl alcohol and cyclohexanol; ethers such as hexyl glycol and phenyl glycol, or ketones such as cyclohexanone, and Pentoxon (Shell). Preferred among these are cyclohexanone, isobutanol, 2-butanol, benzyl alcohol or ethylene glycol monoethyl ether acetate.

Since the preparations according to the invention have a low content of electrolytes, they can be used, in contrast to commercial preparations of disperse dyes, also along with electrolyte-sensitive thickeners for producing printing pastes. Thickeners which have proved particularly valuable in this connection are in particular thickeners having a polyacrylic base. Their viscosity is not appreciably lowered by the preparations according to the invention, a factor which is of vital importance in practice.

The novel dye preparations are thinly liquid, have a low content of dispersing agents and of electrolytes, are finely dispersed, stable to dispersion, that is to say, not aggregating, and have a high concentration of dye. They remain stable both after prolonged storage at 25° to 30° C. and after a storage time of several weeks at 60° C., that is, they have low viscosity and are perfectly filterable and their viscosity changes only to an insignificant extent. The fine distribution of the dyes during storage remains virtually unchanged. The novel preparations can be dispersed free from specks in textile printing pastes with all conventional thickenings. By virtue of the high degree of fixation attainable with the novel preparations, no fixing accelerator is necessary on application of these preparations on polyester material in the direct printing process.

A quite considerable advantage on application of the novel preparations in direct printing on textile material is that no subsequent washing, or only a single washing of the dyed material with a small amount of water, has to be carried out. This is due to the low content of dispersing agent, to the possibility of using synthetic thickeners having a polyacrylic base, and to the high degree of fixation.

The preparations of disperse dyes obtainable hitherto usually contain a small amount of dye together with large amounts of dispersing agents, which have to be washed out after fixation of the dye, a procedure which causes a severe contamination of the waste water.

The novel aqueous dye preparations are used for producing aqueous, aqueous-organic or organic dye liquors or printing inks, or dye liquors or printing inks based on a water-in-oil emulsion. These are suitable for dyeing or printing organic material, especially synthetic textile materials, by continuous or discontinuous processes, for example materials made from cellulose triacetate, synthetic polyamides and in particular polyesters. The dyeings can be obtained by dyeing, padding or printing processes. The additives customarily used in applying disperse dyes to synthetic material are employed in these processes. The materials can be in the most varied stages of processing.

For the continuous dyeing of mixed fabrics made from polyester and cellulose material, there are customarily used disperse dyes for the polyester constituent and, inter alia, reactive dyes for the cellulose constituent, using single-bath/single-stage processes. As is known, undesirable reactions between anionic dispersing agents in the disperse dye and the reactive dye occur, and lead to considerable reductions in yield of the reactive dyeings, and hence to problems with regard to reproducibility of the dyeings, and also to intensified contamination of the waste water.

When however disperse-dye formulations according to the present invention are used, the described disadvantages are completely or to a great extent eliminated.

The dye preparations according to the invention can also be used for printing of sheet materials according to the transfer printing principle. The transfer printing process is generally known, and is described in detail for example in the French Patent Nos. 1,223,330, 1,334,829 and 1,585,119. So-called auxiliary carriers, which have been printed with suitable printing inks, are brought into close contact with the substrate to be printed, whereupon the dye, by the action of heat and optionally pressure, is transferred from the carrier to the substrate.

Suitable auxiliary carriers are heat-stable and dimensionally stable sheet materials, advantageously having smooth surfaces, such as paper, cellophane, metal sheets, etc. (see British Patent No. 1,190,889). Paper is preferred.

The composition of the printing inks depends on the type of substrate, of printing process, of carrier material, and so forth. Both aqueous printing inks and printing inks having a solvent base, particularly an alcoholic base, are customarily used. In general, they consist of a sublimable dye, a binder, water and/or a solvent, optionally thickeners, optionally fillers and optionally dispersing agents.

The aqueous preparations of disperse dyes according to the invention have the remarkable characteristic that they can be dispersed, in an aggregate-free and stable manner, both in purely aqueous printing-ink systems and in aqueous-alcoholic systems.

The transfer is effected in the usual manner by the action of heat. For this purpose, the treated carrier materials are brought into contact with the textile materials to be printed, and held at about 120° to 210° C. until the defined dyes applied to the carrier material have been transferred to the textile material. A time of 5 to 60 seconds is as a rule necessary for this operation.

After the heat treatment has been completed, the printed material is separated from the carrier. This material requires no aftertreatment, neither a steam treatment to fix the dye, nor a washing treatment to improve the fastness properties.

Suitable transfer-printing substrates are preferably sheet materials, such as fleeces, felts, carpets, and in particular fabrics and knitwear made from synthetic fibres.

If the novel preparations contain optical brighteners, they are used for optically brightening textile materials by, for example, the exhaust process, high-temperature exhaust process and padding-therm process. Further suitable dispersing agents or other auxiliaries can if necessary be used for stabilising the liquor and/or for obtaining carrier effects.

A further application for the optical-brightener preparation according to the invention is the brightening of spinning solutions.

The Examples which follow illustrate the invention but the invention is not limited to them. The term 'parts' signifies parts by weight, and percentages are given as percent by weight. Except where otherwise stated, the percentage values relate to the total weight of the preparations. The temperatures are in degrees Centigrade. Unless otherwise stated, the viscosity values were measured at 20° C. with a Brookfield viscosimeter, Type LVT, with spindle 2 at 50 revolutions per minute (rpm).

The filterability of the dyes was determined by means of the following filter test:

200 ml of softened water is added to a weighed amount of ground material, and the whole is vigorously stirred. The amount of ground material is to be so proportioned that the test dispersion contains 1 part per thousand parts of dye active substance. The diluted dispersion is filtered on a porcelain suction filter through a hard filter of 7 cm diameter (Filter 597 of Schleicher and Schuüll) under a vacuum of about 25 Torr. The hard filter 597 enables a perfectly satisfactory filtration to be carried out only when the dye particles of the suspension are essentially less than 5 microns.

EXAMPLE 1

A Resination of the dye 120 g of the disperse dye of the formula

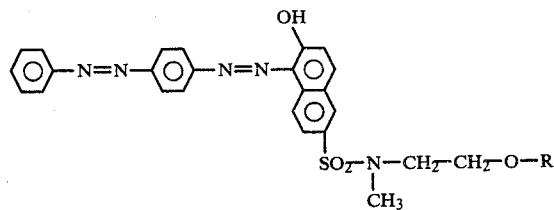

R=50% of H, 50% of OC—CH$_3$ in the form of the dry crude dye and 6.32 g of ketone resin (condensation product from cyclohexanone and formaldehyde) are stirred into 200 g of cyclohexanone. After the temperature has been raised approximately to boiling point, the resin and the dye dissolve completely in the solvent within a stirring time of one hour. There is subsequently added 1.5 liters of water at 90°–95° in the course of 10–15 minutes. The mixture is then allowed to cool with further stirring, in the process of which the dye together with the resin precipitates in the form of relatively uniformly small granules, which can be easily separated by decanting. After cooling is complete, the stirrer is switched off, and the granules then quickly settle. The supernatant solution, consisting of cyclohexanone, water, dye impurities and traces of the starting material, is poured off, the residue is thoroughly stirred with fresh water, filtered off under suction, and carefully rerinsed on the suction filter. The granular residue is finally dried at 90°–100° in a vacuum drying chamber. The yield is about 120 g of "resinated" dye.

B Production of the dye preparation 47.25 parts of this "resinated" dye are stirred up with 2 parts of lignin sulfonate and 3 parts of a nonionic copolymer from ethylene oxide and propylene oxide in 17 parts of 1,2-propylene glycol and 33 parts of water, and ground in a bead(ball) mill down to a primary particle size essentially far below 5μ. There is obtained a highly concentrated, thinly liquid, storage-stable preparation, which does not gel even after 14 days' storage at 60°. The preparation contains 44.0% of dye, 32.2% of water, 16.6% of 1,2-propylene glycol, 3% of nonionic copolymer, 2.2% of ketone resin and 2% of lignin sulfonate. 5.3% of ketone resin relative to the dye is present.

If 45 parts of the untreated crude dye of the above-given formula are used in place of 47.25 parts of the resinated dye, the procedure otherwise being as described under B, the dye is considerably more difficult to stir, and has to be constantly diluted with water during grinding in order to prevent a gelation of the material being ground. After the same degree of grinding as that described above has been attained, the resulting dye preparation has a dye content of only 22%. It is already gelling after standing for a few hours at room temperature, and quickly loses its good filterability as a result of reaggregation of the fine particles.

By using, instead of 47.25 parts of the resinated dye, 45 parts of the same crude dye which has been pretreated as described under A but without the addition of ketone resin, there is obtained a thinly liquid preparation containing 45% of dye, which gels however at 60° after only a few hours and loses its good filterability.

EXAMPLE 2

11.2 parts of ketone resin (acetophenone resin) and 8.0 parts of ethyl cellulose as well as 350 parts of dry dye of the following formula

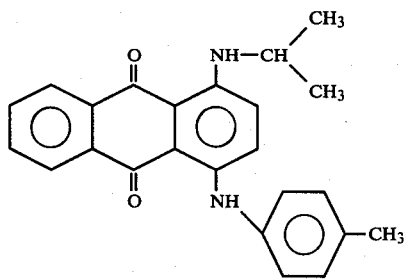

are stirred into a solution of 5 parts of a fatty alcohol polyglycol ether from cetyl alcohol/stearyl alcohol and 25 mols of ethylene oxide, and 40 parts of a formaldehyde condensate of sodium naphthalene sulfonate in 585.8 parts of water. The ketone resin in tablet form and the ethyl cellulose flakes are together very finely preground in a laboratory mill before being stirred into the mixture. The finished mix is ground in a bead mill containing siliquartzite beads of 1 mm diameter for 4 hours, in the course of which the particle size of the dye is reduced essentially to below 5μ. After separation of the grinding elements, 900 parts of the produced ground material are mixed with 900 parts of water-saturated 2-butanol (regenerated material) consisting of about 643 parts of 2-butanol and 257 parts of water, and the whole is stirred for one hour, during which time a mixture of two liquid phases is formed. Ketone resin and ethyl cellulose dissolve in the 2-butanol phase saturated with water. The finely ground dye too simultaneously passes into this organic phase. After one hour, the solvent phase is dissipated by stirring in 6000 parts of cold water, and the fine granules which form are filtered off with suction and subsequently carefully washed on the suction filter. The dye content of the moist granular, resinated press cake is 44%.

600 parts of this press cake are stirred up with 112 parts of 1,2-propylene glycol, 12 parts of lignin sulfonate and 25 parts of the nonionic copolymer used in Example 1, and the mixture is then ground in a bead mill with siliquartzite beads of 1 mm diameter for 14 hours. After separation from the grinding elements, the resulting dispersion has excellent stability in storage. After a storage period of several months, the results of the filter test on this preparation are still completely satisfactory. Also after 14 days' storage in a hermetically sealed vessel in a heating chamber at 60°, the dispersion remains thinly liquid, and there are no signs of a recrystallisation of the dye commencing.

If the procedure is carried out as described above except that when stirring the dye no ketone resin and ethyl cellulose are added, a liquid dispersion is obtained which after only a short period of time (after 14 days' storage at room temperature or after 12–24 hours at 60° C.) contains as sediment a significant proportion of dye that has recrystallised in needle-like form. In consequence of this recrystallisation, the dispersion is no longer filterable and hence of no use in practice.

EXAMPLE 3

350 parts of the blue dye from Example 2 are stirred into a solution of 5 parts of fatty alcohol polyglycol ether and 40 parts of the formaldehyde condensate from Example 2 in 605 parts of water, and the mixture is ground with siliquartzite beads of 1 mm diam. for 4 hours. After separating the grinding elements, there are added to 900 parts of this dispersion a separately prepared solution of 10.08 parts of the ketone resin from Example 2 and 7.2 parts of ethyl cellulose in 800 parts of 2-butanol saturated with water, and the mixture is vigorously stirred for 20 minutes, in the course of which the finely ground dye passes into the liquid organic phase which is separating from the water and which contains the ketone resin and ethyl cellulose in dissolved form. After 20 minutes, 6000 parts of cold water are added, and the procedure otherwise is then carried out as described in Example 2. The dye content of the moist granular, resinated dye press cake is likewise 44%.

This press cake is further processed in the manner described in Example 2 into the form of a liquid dye preparation, which has the same properties.

If the procedure is carried out as described above except that, after grinding of the dye, there are added 800 parts of water-saturated 2-butanol containing no ketone resin and no ethyl cellulose, the result is a liquid dispersion which already after a short time (after 14 days' storage at room temperature or after 12–24 hours at 60° C.) contains a very significant proportion of dye as sediment, which has recrystallised in needle-like form. Because of this recrystallisation, the dispersion is no longer filterable and hence of no use in practice.

EXAMPLE 4

100 g of the dye mixture of the following formula

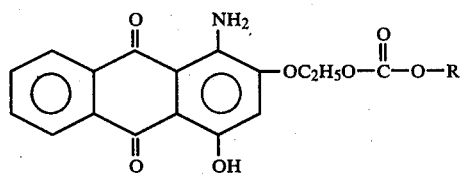

R=47.4% of $C_2H_5$, 52.6% of $C_6H_5$ and 5.5 g of the ketone resin from Example 1 are stirred into 200 g of cyclohexanone. After heating to approximately boiling temperature, the resin and the dye dissolve completely within a stirring time of about 1 hour. An addition of 1.6 liters of water at 90°–95° is made, and the mixture is then allowed to cool with stirring. After the stirrer has been switched off, the organic phase settles on the bottom of the vessel. The supernatant mixture of cyclohexanone/water is poured off, and the residue is subsequently again stirred up with about 1.6 liters of cold water. The dye coated with resin forms fine granules and can be readily filtered off on a suction filter. The residue is thoroughly rinsed with water and then dried at 80°-90° in a vacuum chamber. The result is about 95 g of "resinated" dye.

A dye preparation is prepared with this "resinated" dye exactly in the manner described in Example 1, and there is thus obtained a thinly liquid, storage-stable preparation, the good filterability of which is retained even after months of storage.

If however the untreated dye mixture or the dye mixture pretreated as described above but without the addition of ketone resin is used to produce the dye preparation, the procedure followed being otherwise the same, there are obtained unstable preparations, in which there is a marked tendency for reaggregation to occur.

EXAMPLE 5

8.75 g of the ketone resin from Example 1 and 50 g of the blue disperse dye of the following formula, as dry crude dye,

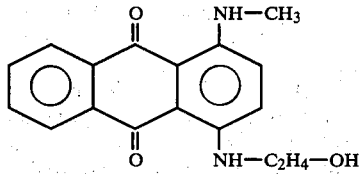

are stirred into 100 g of cyclohexanone, and the mixture is held for 60 minutes at a temperature of 95°. After this treatment time, 700 ml of water likewise at 95° is slowly added, and the whole is allowed to cool to room temperature as stirring proceeds. After the stirrer has been switched off, the granular "resinated" dye settles out rapidly, and the supernatant liquor can then be filtered off with suction. As much as possible of the tenaciously adhering solvent is removed from the granules by the further addition of about 700 ml of water. Solvent-free "resinated" dye granules are obtained by filtration under suction, thorough rinsing with additional water and drying in the vacuum drying chamber.

316 parts of these granules can be readily stirred up in 170 parts of glycerol and 464 parts of water, in which are dissolved 20 parts of lignin sulfonate and 30 parts of an ethylene oxide/propylene oxide adduct, to give a thinly liquid dispersion, and this is finely ground in an open sand mill with Ottawa sand until the results of the filter test are perfectly satisfactory. The grinding time is 16 to 18 hours. After separation of the sand and defoaming with 1 to 2 parts of an antifoaming agent, there is obtained a thinly liquid preparation which is excellently stable in storage even at temperatures up to 40°.

If 300 parts of crude dye are used in place of the "resinated" dye according to the process of the invention, the same procedure otherwise being followed, there results a gelled pasty mass having a viscosity of over 10,000 cP (Brookfield viscosimeter LVT, spindle 2), which gels after a short storage time at elevated temperature to form a gel that is no longer reversible.

EXAMPLE 6

3.6 g of a ketone resin (condensation product from cyclohexanone and formaldehyde) and 70 g of the blue disperse dye mixture of the following formula, as dry crude dye,

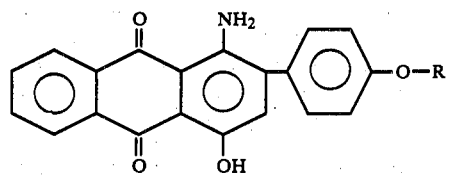

R=50% of H, 50% of $CH_3$ are stirred into 100 g of cyclohexanone. After heating at 90°-100° for 30 minutes, about 700 ml of water at 70°-80° is added in successive stages, in the course of which the dye together with the resin precipitates in granular form. After cooling and switching off the stirrer, the formed granules rapidly settle out. The solvent-/water mixture is carefully filtered off with suction, and the residual solvent is taken up by the addition of a further 700 ml of cold water. The granules can be filtered off under suction without difficulty and are then washed with water, and dried at 90°-100° in a vacuum drying chamber.

30 parts of these granules can be readily stirred up, in the manner described in Example 1, with 1.5 parts of lignin sulfonate, 2 parts of polyethylene-polypropylene oxide condensate, 20 parts of 1,2-propylene glycol and 46.5 parts of water to form a thinly liquid slurry, which can be ground in a bead(ball) mill for 5 hours to yield perfectly satisfactory results in the filter test. After removal of the grinding agent and complete defoaming, the result is a stable preparation having a viscosity of about 1600 cP.

The same number of parts of untreated dye cannot however be ground to a fine suspension containing 30% of dye, because the slurry formed after stirring has a viscosity of over 2000 cP, and shortly after the commencement of grinding, the suspension gels to form an immovable mass.

EXAMPLE 7

30 parts of the dye preparation obtained according to Example 6 are stirred into 970 parts of a 25% solution of a high-molecular polyacrylic acid in distilled water, the pH value of which has been adjusted to 6.8 with sodium hydroxide solution, and the whole is thoroughly homogenised. The result is a printing paste having a viscosity of about 28,000 cP (Brookfield viscosimeter RVT, spindle 4, 6 rpm at 20° C.).

A polyester fabric is printed with this printing paste on a roller printing machine. Drying is then carried out at 100°-140°, and the printed fabric is fixed in hightemperature steam at 180° for 8 minutes.

Instead of this so-called HTS fixing process, a dry fixing process (thermosol treatment) for one minute at 200°-210° can just as well be carried out.

The material is ready for use after the fixing treatment. There are obtained polyester printings of soft handle, of high brilliance and of optimum colouring strength. The degree of fixation of the blue dye is over 98%. A subsequent washing of the printed and fixed fabric is therefore unnecessary, because the handle obtained as well as the fastness properties fully satisfy the demands made in practice.

EXAMPLE 8

50 parts of the red dye preparation obtained according to Example 1, B, first paragraph, are stirred into 950 parts of a 0.3% solution of a high-molecular polyacrylic acid in distilled water, the pH value of which has been adjusted to 6.8 with sodium hydroxide solution, and the whole is well homogenised. The result is a printing paste having a viscosity of about 35,000 cP (Brookfield viscositmeter RVT, spindle 4, 6 rpm at 20°).

A polyester fabric or knitted fabric is printed with this printing paste on a rotary screen printing machine. A preliminary drying treatment is carried out at 100°–140°, and the dried fabric or knitted article is fixed in hightemperature steam at 180° for 8 minutes. Instead of this high-temperature steam treatment, a dry fixing treatment can be carried out for one minute at 200°–210°.

After the fixing stage, the textile strip is washed in a winch vat or in a continuous washing machine just briefly at bath temperatures of 20°–50°. The minute amount of employed synthetic thickener and also the very small amount of nonfixed dye can be easily and rapidly removed from the fabric by cold to lukewarm water by virtue of the good solubility of the thickening agent.

There are thus obtained brilliantly, deeply coloured violet shades having good fastness to washing, to water and to rubbing. The degree of fixation of the dye is above 95%.

EXAMPLE 9

30 parts of a liquid dye preparation formulated according to Example 2 are stirred into 500 parts of a stock thickening of the following composition, and then homogenised:

15 parts of sodium alginate thickening,
259 parts of water,
1 part of formalin,
150 parts of a 20% aqueous polyvinyl alcohol solution containing 10–17% of polyvinyl acetate as copolymer component, and
75 parts of a 10% aqueous solution of a wetting agent and defoaming agent (containing nonylphenol diglycol ether sulfate, silicone oil and a solvent).

Finally, the mixture is diluted with water until the viscosity according to the Fluidmeter Lefranc is about 15.

This printing ink is printed on a Saueressig gravure printing machine, with a printing speed of 60 m/min., onto a suitable paper web, and subsequently dried.

After a hot calendering treatment for 35 seconds at a temperature of 210° in contact with a polyester fabric or knitted article, there is formed on this a printing having a pure greenish, turquoise blue colour possessing excellent general fastness properties.

EXAMPLE 10

2616 parts of an approximately 50% press cake of the dye from Example 2 are stirred into a solution of 724 parts of water containing 160 parts of di(6-sulfonaphthyl-2)-methane and 40 parts of a fatty alcohol polyglycol ether from cetyl alcohol/stearyl alcohol having 25 mols of ethylene oxide. The dispersion obtained is then ground until it can be passed through a coarse filter. This dispersion is covered with a solution consisting of 2460 parts of a sec-butanol regenerated product (73% of secbutanol, 27% water), 32 parts of acetophenone resin and 21.3 parts of ethyl cellulose. The dye is flushed into the organic phase by vigorous stirring. 8000 parts of water are added, the formed granules are filtered off, carefully washed on the suction filter, and dried at 90 to 100°.

927.5 parts of the granules obtained in this manner are stirred into a solution containing 963 parts of water, 590 parts of 1,2-propylene glycol, 21 parts of 37% formalin, 9 parts of chloroacetamide, 44.5 parts of lignin sulfonate and 84 parts of the nonionic copolymer used in Example 1, and the whole is then ground until the primary particle size is essentially below $5\mu$. The grinding elements are removed, and 391 parts of water are added.

There is obtained a dye dispersion consisting of
30.0% of dye,
0.9% of acetophenone resin,
0.6% of ethyl cellulose,
1.5% of lignin sulfonate,
3.0% of a copolymer formed from ethylene oxide and propylene oxide,
0.3% of chloroacetamide,
0.7% of formalin (37%),
20.0% of propylene glycol, and
43.0% of water.

The dispersion has excellent stability in storage. After a storage time of several months, the results of the filter test on this preparation are still perfectly satisfactory. Also after 14 days' storage in a hermetically sealed vessel in a heating chamber at 60°, the dispersion remains thinly liquid, and there are no signs of any recrystallisation of the dye commencing.

EXAMPLES 11 to 13

If the procedure is carried out as described in Example 2 except that in place of the disperse dye there are used identical amounts of the vat dyes shown in the following Table, dye preparations having similarly good stability in storage are obtained.

| Example | Dye |
|---------|-----|
| 11 | (chloro-substituted dianthraquinone with NH-NH bridges and Cl substituents) |
| 12 | (polycyclic quinone with $Br_{1-2}$) |
| 13 | (polycyclic quinone with two $OCH_3$ groups) |

EXAMPLE 14

If the procedure is carried out as described in Example 2 except that in place of 12 parts of lignin sulfonate there are used 8 parts of an anionic dispersing agent of the general formula

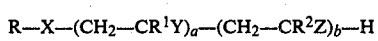

(Polywet KX-3 or Polywet KX-4 or Polywet KX-5), dye preparations having equally good stability in storage are obtained.

EXAMPLE 15

6.5 g of acetophenone resin is stirred into 100 g of ethanol. After the resin has dissolved, 350 g of the dye from Example 2 in the form of press cake having a dye content of 45% and 400 ml of water are added. The mixture is heated and the ethanol is completely distilled off, the distillate being replaced by corresponding amounts of water. The mixture is cooled to 70° and is filtered through a suction filter; the residue is subsequently washed with 2 liters of water and is then well filtered off under suction. The yield is 180 g of "resinated" dye having a dry content of 80%.

330 parts of "resinated" dye are stirred up with 112 parts of 1,2-propylene glycol, 12 parts of lignin sulfonate, 25 parts of a copolymer formed from ethylene oxide and propylene oxide, and 270 parts of water, and the whole is ground in a bead(ball) mill to a primary particle size of 1 to 2μ. The dispersion obtained after removal of the grinding elements has excellent stability in storage.

What is claimed is:

1. An aqueous dyestuff composition, containing at least 10% by weight of water, 25 to 60% by weight of a finely dispersed dye which is difficultly soluble in water and is soluble in boiling perchloroethylene to the extent of less than 0.5 g/kg, an effective amount of a dispersing agent selected from the group consisting of anionic dispersing agents and non-ionic dispersing agents, and a resin which has affinity for the dye and which is more soluble than the dye in a solvent that is soluble in water to the extent of about 10 to 350 g/l, wherein the resin is a synthetic ketone resin and is present in an amount of 1 to 10% by weight, relative to the dye.

2. The composition of claim 1, which contains 0.1 to 5 percent by weight of an anionic dispersing agent and 0.1 to 5 percent by weight of a nonionic dispersing agent.

3. The composition of claim 2, which contains 0.5 to 2 percent by weight of an anionic dispersing agent and 0.5 to 2 percent by weight of a nonionic dispersing agent.

4. The composition of claim 1, which contains 35 to 50 percent by weight of a finely dispersed dye difficultly soluble in water.

5. The composition of claim 1, which contains as the dye a difficultly water-soluble dye which is slightly hydrophilic and which in a concentrated aqueous suspension tends to form thixotropic gels or to recrystallise.

6. The composition of claim 1, which contains one or more of the following dyes:

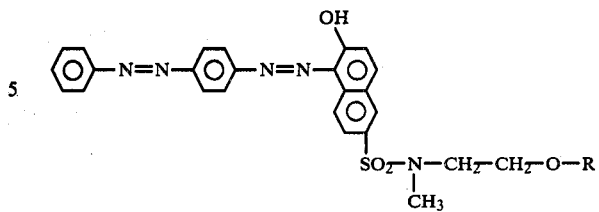

in which R is H or OCCH$_3$;

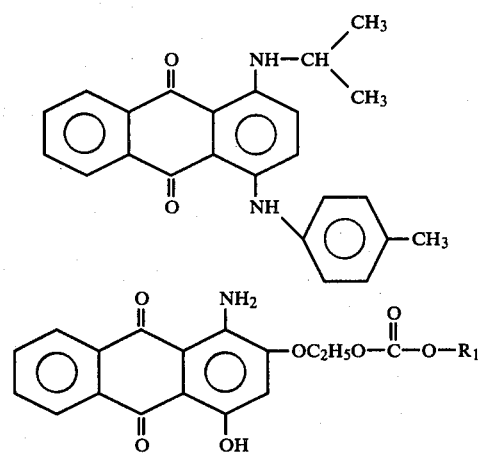

in which R$_1$ is C$_2$H$_5$ or C$_6$H$_5$;

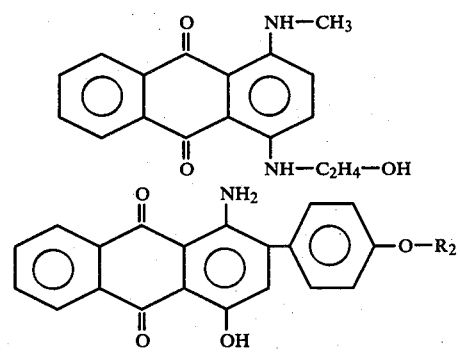

in which R$_2$ is H or CH$_3$.

7. The composition of claim 1, which contains a lignin sulfonate as the anionic dispersing agent.

8. The composition of claim 1, which contains as the nonionic dispersing agent a copolymer from ethylene oxide and propylene oxide having an ethylene oxide content of at least 65% percent by weight.

9. The composition of claim 1, which contains 20 to 40% of the turquoise blue dye of the formula

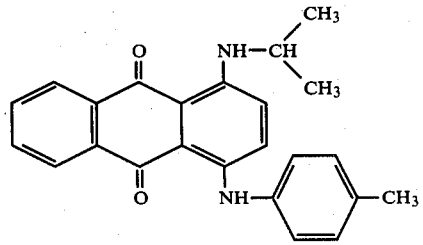

0.5 to 2% of acetophenone resin,
0 to 2% of ethyl cellulose,
0.5 to 2% of lignin sulfonate,
0.1 to 5% of a copolymer from ethylene oxide and propylene oxide containing 80% of ethylene oxide,
0.5 to 1% of a bactericide,
15 to 25% of propylene glycol, and
30 to 50% of water.

10. The composition of claim 1, wherein the resin content is in the range of 3 to 7% by weight, relative to the dye.

11. The composition of claim 8, wherein the ethylene oxide content of the copolymer is at least 80% by weight.

12. The composition of claim 1, wherein the synthetic ketone resin is a condensation product formed from formaldehyde and a ketone selected from the group consisting of acetophenone and cyclohexanone.

13. The composition of claim 1, which further contains an additive selected from the group consisting of hygroscopic agents, antifrost agents, antimicrobics, fungicides, antifoaming agents, agents improving viscosity, and complexing compounds.

14. The composition of claim 1, which contains at least 20% by weight of water, 0.1 to 5% by weight of a lignin sulfonate, and 0.1 to 5% by weight of a copolymer from ethylene oxide and propylene oxide containing at least 65% by weight of ethylene oxide.

15. The composition of claim 14, which contains 35 to 50% by weight of the dye, 0.5 to 2% by weight of the lignin sulfonate, 1 to 3% by weight of the copolymer from ethylene oxide and propylene oxide containing at least 80% by weight of ethylene oxide, and the resin, with the resin being present in an amount of 3 to 7% by weight, relative to the dye.

* * * * *